US009880886B2

(12) United States Patent
Chai et al.

(10) Patent No.: US 9,880,886 B2
(45) Date of Patent: Jan. 30, 2018

(54) FRAMEWORK TO IMPROVE PARALLEL JOB WORKFLOW

(71) Applicant: International Business Machines Corporation, Armonk, NY (US)

(72) Inventors: Hua Chai, Beijing (CN); Chuan Wei Guo, Beijing (CN); Jun He, Beijing (CN); Guang Lei Li, Beijing (CN); Rong Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/076,239

(22) Filed: Mar. 21, 2016

(65) Prior Publication Data
US 2016/0203031 A1 Jul. 14, 2016

Related U.S. Application Data

(63) Continuation of application No. 14/294,408, filed on Jun. 3, 2014.

(30) Foreign Application Priority Data

Jun. 28, 2013 (CN) .......................... 2013 1 0267938

(51) Int. Cl.
*G06F 9/50* (2006.01)
*G06F 9/52* (2006.01)
(Continued)

(52) U.S. Cl.
CPC .......... *G06F 9/5083* (2013.01); *G06F 9/5027* (2013.01); *G06F 9/52* (2013.01);
(Continued)

(58) Field of Classification Search
CPC ..................................................... G06F 9/5083
(Continued)

(56) References Cited

U.S. PATENT DOCUMENTS 5,553,235 A 9/1996 Chen et al.
5,870,545 A 2/1999 Davis et al.
(Continued)

OTHER PUBLICATIONS

Brelsford et al., "Partitioned Parallel Job Scheduling for Extreme Scale Computing", 2010.*
(Continued)

*Primary Examiner* — O. C. Vostal
(74) *Attorney, Agent, or Firm* — DeLizio Law, PLLC

(57) ABSTRACT

Embodiments of the inventive subject matter include receiving, in a distributed computing environment, a plurality of files for execution. Embodiments further include identifying, by parsing the plurality of files, code segments contained in each of the plurality of files. Embodiments further include determining, based on a comparison of the code segments and definitions contained in a distributed computing basic function library, a first group of the code segments that include configuration tasks and a second group of the code segments that include computational tasks. Embodiments further include combining the first group of the code segments to form a super configuration task. Embodiments further include creating an executable code, wherein the executable code comprises the super configuration task and the second group of code segments. Embodiments further include allocating the executable code to one or more nodes. Embodiments further include executing the executable code on the one or more nodes.

9 Claims, 8 Drawing Sheets

(51) Int. Cl.
*G06F 15/00* (2006.01)
*H04L 12/24* (2006.01)
*G06Q 10/06* (2012.01)

(52) U.S. Cl.
CPC .............. *G06F 15/00* (2013.01); *G06Q 10/06* (2013.01); *H04L 41/0886* (2013.01); *H04L 41/0893* (2013.01); *H04L 41/5096* (2013.01)

(58) Field of Classification Search
USPC ........................................................ 709/226
See application file for complete search history.

(56) References Cited

U.S. PATENT DOCUMENTS

| | | | |
|---|---|---|---|
| 5,950,201 | A | 9/1999 | Van Huben et al. |
| 6,230,312 | B1 | 5/2001 | Hunt |
| 7,415,507 | B1 | 8/2008 | Ward et al. |
| 7,765,521 | B2* | 7/2010 | Bryant .................. G06F 9/505 709/203 |
| 7,861,246 | B2 | 12/2010 | Lu et al. |
| 8,250,339 | B2* | 8/2012 | Master .................. G06F 7/57 712/15 |
| 8,489,872 | B1* | 7/2013 | Kapoor ............. G06F 17/30386 709/227 |
| 8,881,287 | B1 | 11/2014 | Griffin et al. |
| 9,348,569 | B1* | 5/2016 | Chopra .................. G06F 8/52 |
| 9,471,299 | B1 | 10/2016 | Nelson et al. |
| 2004/0122741 | A1* | 6/2004 | Sidman .................. G06Q 10/10 705/26.1 |
| 2004/0210883 | A1 | 10/2004 | Diedrich et al. |
| 2006/0080681 | A1 | 4/2006 | Anwar et al. |
| 2007/0027630 | A1 | 2/2007 | Sanchez |
| 2008/0051921 | A1* | 2/2008 | Nammatsu ............. G06Q 10/06 700/97 |
| 2008/0134156 | A1 | 6/2008 | Osminer et al. |
| 2009/0254601 | A1 | 10/2009 | Moeller et al. |
| 2010/0274982 | A1 | 10/2010 | Mehr et al. |
| 2010/0281459 | A1 | 11/2010 | Betouin et al. |
| 2010/0293549 | A1 | 11/2010 | Brelsford et al. |
| 2010/0312805 | A1 | 12/2010 | Noonan, III |
| 2011/0060895 | A1* | 3/2011 | Solomon .................. G06F 8/36 713/1 |
| 2012/0167064 | A1 | 6/2012 | Miyoshi |
| 2012/0215878 | A1* | 8/2012 | Kidron ............. G06F 17/30867 709/213 |
| 2014/0109106 | A1 | 4/2014 | Fanning et al. |
| 2015/0006735 | A1 | 1/2015 | Chai et al. |

OTHER PUBLICATIONS

Govindarajan et al., "Tightly Integrated Design Space Exploration with Spatial Temporal Partitioning in SPACS*", 2000.*

Abawajy, "An Integrated Resource Scheduling Approach on Cluster Computing Systems", Parallel and Distributed Processing Symposium, Proceedings. International, 2003, 6 pages.

Brelsford, et al., "Partitioned Parallel Job Scheduling for Extreme Scale Computing", IBM Systems and Technology Group, 2012, 20 pages.

Middleton, "HPCC Systems: Introduction to HPCC (High-Performance Computing Cluster)", LexisNexis, Commodity Computing Clusters, p. 6, May 24, 2011, 40 pages.

Pallickara, et al., "SWARM: Scheduling Large-Scale Jobs Over the Loosely-Coupled HPC Clusters", eScience, 2008. eScience '08. IEEE Fourth International Conference, Dec. 2008, 8 pages.

Rynge, et al., "Enabling Large-Scale Scientific Workflows on Petascale Resources Using MPI Master/Worker", XSEDE, Jul. 2012, 8 pages.

Govindarajan, et al., "Tightly Intergrated Design Space Exploration with Spatial and Temporal Partitioning in SPARCS", 2000, pp. 7-18.

* cited by examiner

FRAMEWORK TO IMPROVE PARALLEL JOB WORKFLOW

RELATED APPLICATIONS

This application is a Continuation of and claims the priority benefit of U.S. patent application Ser. No. 14/294,408 filed Jun. 3, 2014, which claims the priority under 35 U.S.C. § 119 benefit of China Patent Application No. 201310267938.5 filed Jun. 28, 2013, which is incorporated by reference in its entirety.

FIELD

Embodiments of the present invention relate to distributed computing, and more specifically, to a method and apparatus for managing multiple jobs in a distributed computing system.

BACKGROUND

With the development of computer hardware and software technology, the emergence of computer clusters provides a more efficient data computing power while improving the computing performance of separate computers. Based on distributed computing technology, one or more jobs may be divided into multiple parallel executable tasks, and these tasks may be allocated to one or more processing units (e.g. processor cores) at multiple computing nodes in a distributed computing system for execution. The performance of distributed computing technology depends on, to a greater extent, how to schedule and manage these tasks. Task scheduling and management may be implemented by transmitting various types of control data among respective tasks.

So far, providers of distributed computing technology have developed kinds of basic function libraries capable of supporting distributed computing, where there are defined kinds of basic functions for scheduling and managing parallel tasks. Therefore, independent software vendors (ISVs) in each industry do not have to develop basic functionality supporting distributed computing again. Instead, independent software vendors may develop applications suitable for their industries by invoking functions in basic function libraries. For example, a software vendor in the weather forecasting field may develop applications for weather forecasting based on a basic function library, and a software vendor in the data mining field may develop applications for data analysis based on the basic function library.

Typically the complexity of existing distributed computing systems requires mutual cooperation between multiple applications so as to achieve a computing job. Subjobs of a large computing job have mutual dependences and are in chronological sequence. These sub jobs jointly form a workflow, where multiple applications from one or more independent software vendors might be involved. However, a user does not have source code of these applications but only executable code; therefore, the user can only execute these applications by invoking executable code, which prevents further optimization with respect to the overall performance of respective applications.

Usually each application comprises tasks associated with task management and scheduling. For example, task Allocate may allocate various resources to multiple tasks comprised in an application while the application is running initially, and task Release may release all allocated resources at the end of application running. Suppose applications App-A and App-B are serially executed, then a phenomenon might occur as below: various resources that have been released by release task Release-A of application App-A are allocated to application App-B by allocate task Allocate-B of application App-B. Note tasks such as resource allocation and release do not directly contribute to the computation of an application but are used for assisting in the execution of the application, so the ratio of the execution time for managing and scheduling tasks to the entire application becomes an important factor affecting the operation efficiency of the application.

The time for allocating and releasing resources increases as the number of computing nodes in a distributed computing system increases. With the development of distributed computing systems, the magnitude order of computing nodes has increased from dozens to hundreds or even more, which results in the operation efficiency of jobs in distributed computing systems trends to decrease to some extent. At this point, improving the operation efficiency of distributed computing systems currently becomes a hot issue of research.

SUMMARY

Therefore, it is desired to develop a technical solution capable of managing multiple jobs in a distributed computing system, and it is desired the technical solution can manage the multiple jobs and thus improve the operation efficiency of the multiple jobs in the distributed computing system, without retrieving source code of each job. To this end, the various embodiments of the present invention provide a method and apparatus for managing multiple jobs in a distributed computing system.

According to one aspect of the present invention, there is provided a method for managing multiple jobs in a distributed computing system according to one embodiment of the present invention, the method comprising: dividing, in response to having received multiple jobs, multiple tasks comprised in each of the multiple jobs into configuration tasks and computation tasks, wherein the each of the multiple jobs is an executable program; combining the configuration tasks associated with the multiple jobs into a super configuration task; merging the multiple jobs into a super job based on the super configuration task and the computation tasks; and executing the super configuration task and the computation tasks comprised in the super job by using multiple computing nodes in a distributed computing environment.

According to one aspect of the present invention, the super configuration task is executed only once.

According to one aspect of the present invention, the executable program is written based on a distributed computing basic function library.

According to another aspect of the present invention, there is provided an apparatus for managing multiple jobs in a distributed computing system, the apparatus comprising: a dividing module configured to divide, in response to having received multiple jobs, multiple tasks comprised in each of the multiple jobs into configuration tasks and computation tasks, wherein the each of the multiple jobs is an executable program; a combining module configured to combine the configuration tasks associated with the multiple jobs into a super configuration task; a merging module configured to merge the multiple jobs into a super job based on the super configuration task and the computation tasks; and an executing module configured to execute the super configuration task and the computation tasks comprised in the super job by using multiple computing nodes in a distributed computing environment, wherein the each of the multiple jobs is an executable program.

According to one aspect of the present invention, the super configuration task is executed only once.

According to one aspect of the present invention, the executable program is written based on a distributed computing basic function library.

Using the method and apparatus described in the present invention, tasks involved in a respective job can be managed and scheduled without retrieving source code of the jobs; and the operation efficiency of the respective job in the distributed computing system can be improved as much as possible.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
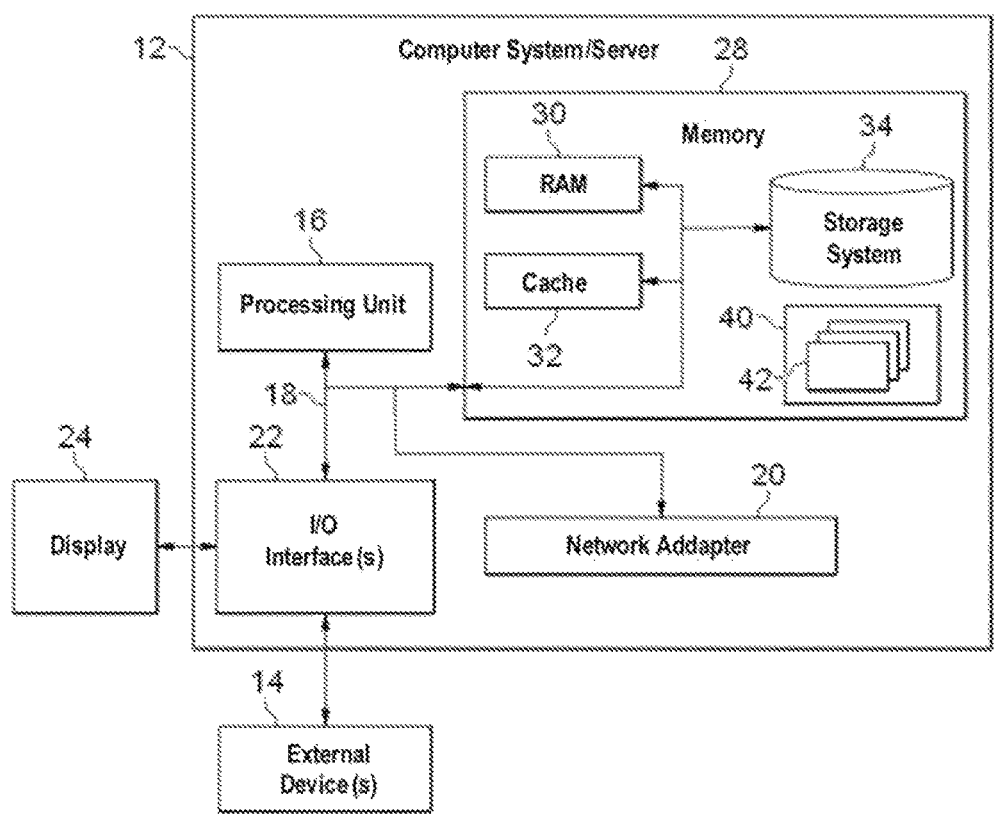
FIG. 1 schematically shows an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. To the contrary, those embodiments are provided for the thorough and complete understanding of the present disclosure, and completely conveying the scope of the present disclosure to those skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including the system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
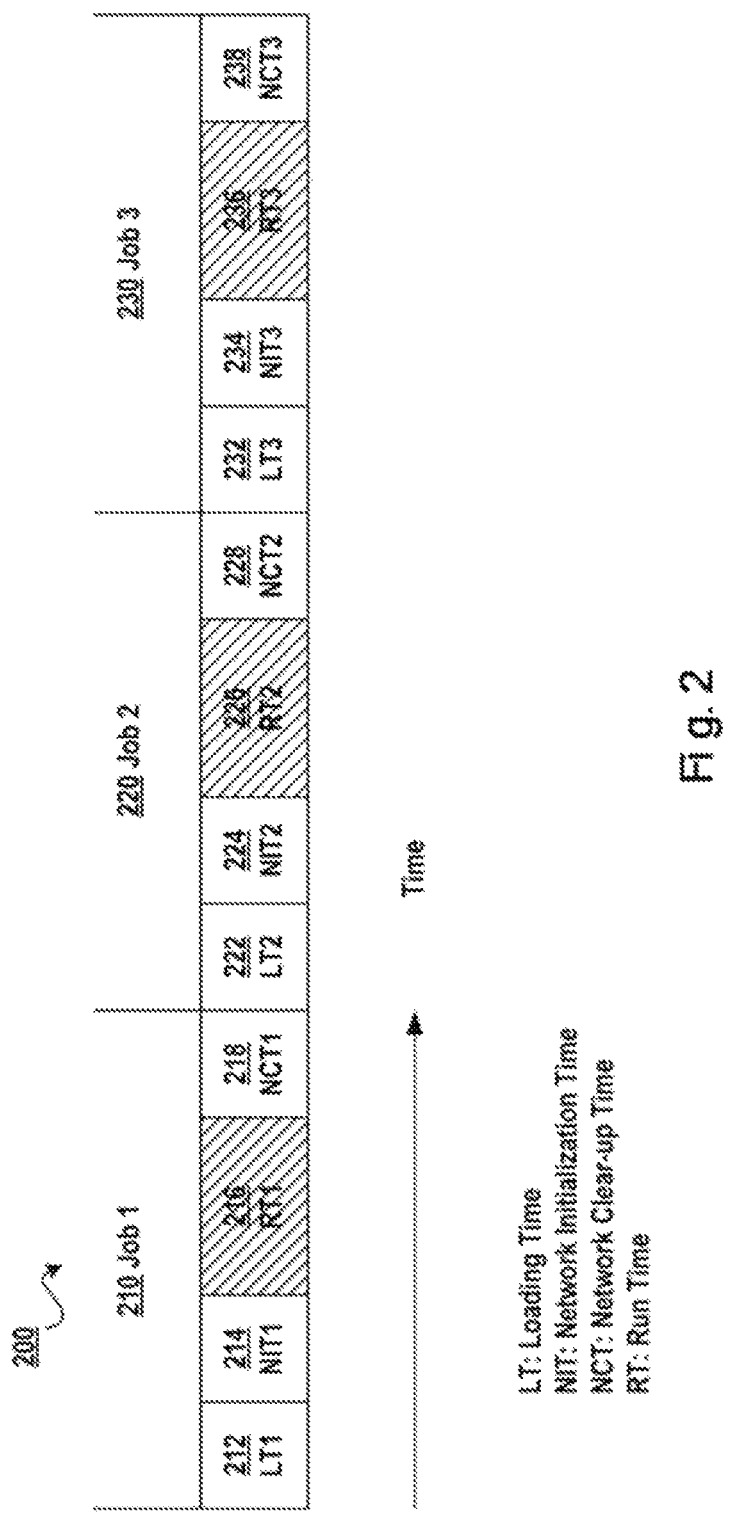
FIG. 2 schematically shows a sequence diagram 200 of a method for executing multiple jobs comprising parallel tasks according to one solution.

FIG. 2 schematically shows a sequence diagram 200 of a method for executing multiple jobs comprising parallel tasks according to one solution. In FIG. 2 there are shown three jobs, i.e. a job1 210, a job2 220 and a job3 230, wherein the horizontal axis represents the time axis. Note in a distributed computing system, one job may comprise multiple tasks at least one part of which may be executed in parallel. While a job is being launched, there might be involved a task for scheduling multiple tasks and a task for initializing various network configurations in a distributed computing environment; and before the job ends, there might further be involved a task for releasing network resources. In some embodiments, the word "jobs" refers to files including executable code to be executed on a computer system.

FIG. 2 shows a sequence diagram of executing tasks in a respective job. Specifically, LT represents loading time, i.e. time for loading a corresponding job; NIT represents network initializing time, i.e. time for initializing various network resources that might be involved during executing a corresponding job; NCT represents network clear-up time, i.e., time that is spent clearing up network resources occupied by a corresponding job; and RT represents run time, i.e. time actually for running tasks associated with a computation object of a corresponding job.

As shown in FIG. 2, job 1 210, job 2 220 and job 3 230 are serially executed. At this point, during executing each job the following operations need to be performed in order: loading operation, network initialization, run operation, and network resource clear-up (for example, with respect to job 1 210, times occupied by these operations correspond to LT1 212, NIT1 214, RT1 216 and NCT1 218, respectively). With respect to job 2 220 and job 3 230, times occupied by various operations are also similar to the time allocation in job 1 210.

As seen from FIG. 2, while executing each job, only shaded time periods RT1 216, RT2 226 and RT3 236 are times actually used for executing tasks associated with a computation object of the job, whereas other time overheads (i.e. LT+MT+NCT) take a large proportion of total time overheads for executing the respective jobs. Therefore, it is desired to increase the proportion of runtime to total time overheads for executing jobs and further improve the efficiency of executing multiple jobs in a distributed computing environment.

In view of the above drawback in existing solutions, one embodiment of the present invention provides a technical solution for managing multiple jobs in a distributed computing system. Generally, the technical solution can allocate resources with respect to an entire workflow all at once, and resources being allocated cause all jobs in the workflow to be correctly executed according to a logical relationship of the workflow; when all jobs in the workflow end, the technical solution can release all resources at the same time.

Specifically, the method comprises: dividing, in response to having received multiple jobs, multiple tasks comprised in each of the multiple jobs into a configuration task and a computation task; combining configuration tasks associated with the multiple jobs into a super configuration task; merging the multiple jobs into a super job based on the super configuration task and the computation task; and executing the super configuration task and the computation task comprised in the super job by using multiple computing nodes in a distributed computing environment, wherein the each of the multiple jobs is an executable program.

Figure 3:
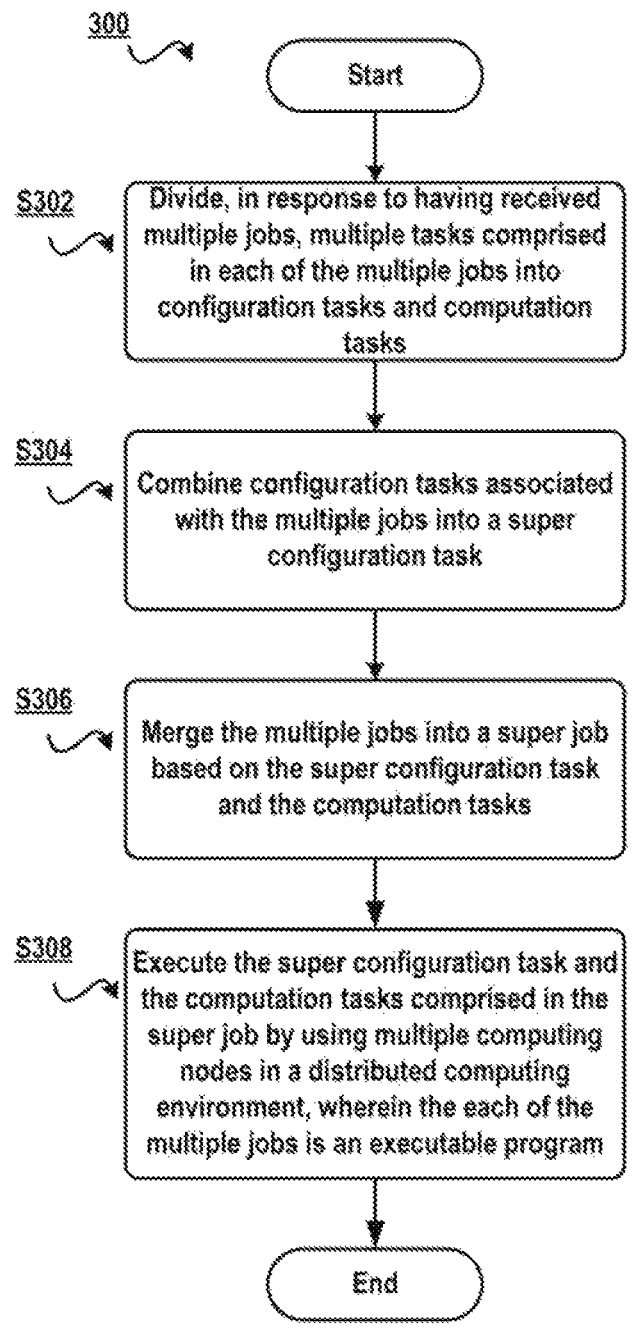
FIG. 3 schematically shows a flowchart of a method for managing multiple jobs in a distributed computing system according to one embodiment of the present invention.

FIG. 3 schematically shows a flowchart 300 of a method for managing multiple jobs in a distributed computing system according to one embodiment of the present invention. The method starts from step S302, where in response to having received multiple jobs, multiple tasks comprised in each of the multiple jobs are divided into configuration tasks and computation tasks. In some embodiments, files containing code segments are parsed, and the code segments are identified and grouped according to their type as a configuration task or computational task based on definitions contained in a basic function library.

As described above, the configuration tasks may represent tasks for scheduling and managing respective tasks in a job, such as a task for launching a job and a task for scheduling (e.g. may comprise resource initializing and resource release) resources involved in executing multiple tasks. The computation tasks may be tasks directly related to the accomplishment of the job's computation object. In this embodiment, multiple tasks comprised in a job may be divided into a configuration task and a computation task based on characteristics of code (e.g. binary code) of an application.

Note in this embodiment the configuration task resulting from the dividing may be one or more configuration tasks, e.g. may comprise tasks for initializing and releasing network resources; and the computation task resulting from the dividing may comprise parallel executable tasks comprised in a respective job. For example, with respect to job 1 210 in FIG. 2, tasks executed during time periods LT1 212, NIT1 214 and NCT1 218 may be configuration tasks, tasks executed during time period RT1 216 may be computation tasks, and the computation tasks may comprise multiple tasks executable in parallel, or tasks in a job may be serially executed. In job 2 220 and job 3 230, types of tasks executed in time periods may also be similar to job 1 210.

Note in the various embodiments of the present invention it is not required all tasks in a job can be executed in parallel, but only at least one part of all tasks may be executed in parallel. In the distributed computing environment, these parallel executable tasks may be dispatched to computing nodes in the distributed computing environment so as to be processed by using computing resources of the respective computing nodes.

Note in the context of the present invention, it is not intended to discuss how to dispatch multiple parallel executable tasks to multiple computing nodes or how to collect intermediate computation results obtained from the multiple computing nodes so as to form a final processing result. Those skilled in the art may implement the procedure based on principles and algorithms of distributed computing.

In step S304, configuration tasks associated with the multiple jobs are combined into a super configuration task. In existing technical solutions, when executing each of multiple jobs, it is necessary to execute a corresponding configuration task in the job. However, functions of configuration tasks of the multiple jobs are roughly identical, and it takes much time to execute the configuration task of each job separately. In this step, time overheads for executing configuration tasks can be reduced by extracting the same content from configuration tasks associated with the multiple jobs and combining these configuration tasks into a super configuration task.

In step S306, the multiple jobs are merged into a super job based on the super configuration task and the computation task. Like a conventional job, the super job may comprise a configuration task and computation tasks. However, unlike the conventional job, the computation tasks in the super job do not come from a single job but are formed by combining computation tasks extracted from the multiple jobs; in addition, the configuration task in the super job is the super configuration task generated in step S304. Note computation tasks from the multiple jobs may be serially arranged directly in an order of executing the multiple jobs, as the computation task of the super job.

Specifically, job Job-A and job Job-B should be serially executed in a distributed computing system, and according to the dividing step shown in step S304 in FIG. 3, multiple computation tasks Task-A 1, . . . , Task-A N and multiple computation tasks Task-B 1, . . . , Task-B M have been extracted from Job-A and job Job-B, respectively. At this point, the merged super job may be constructed such that the computation tasks Task-B 1, . . . , Task-B M are executed after executing computation tasks Task-A 1, . . . , Task-A N.

In step S308, the super configuration task and the computation task comprised in the super job are executed by using multiple computing nodes in a distributed computing environment, wherein the each of the multiple jobs is an executable program. In this embodiment, the super job may be executed using multiple computing nodes in a distributed computing environment in a manner similar to executing a conventional job.

Note the method according to the various embodiments of the present invention can conduct performance optimization while jobs are running, so as to improve the execution efficiency of each job. Since source code of each job cannot be obtained at runtime but only executable programs can be obtained, the optimization during running is conducted based on executable programs and does not involve any content regarding programmers optimize source code during the development phase.

Specifically, since the super job may comprise parallel executable tasks, at this point these parallel executable tasks may be executed by using multiple computing nodes. For example, continuing the example shown in step S306, when the super task comprises computation tasks Task-A 1, . . . , Task-A N and computation tasks Task-B 1, . . . , Task-B M, first computation tasks Task-A 1, . . . , Task-A N are executed at least partially in parallel by using multiple computing nodes, and then computation tasks Task-B 1, . . . , Task-B M are executed at least partially in parallel by using the multiple computing nodes.

At this point, although the exact time for executing these two groups of computation tasks may possibly be in sequential, with respect to all computation tasks comprised in the super task, at least one part of them are executed in parallel.

In one embodiment of the present invention, the super configuration task is executed only once. Note in distributed computing technology, configuration tasks associated with task management and scheduling may be the same; since multiple configuration tasks have been combined into a super configuration task in step S304, in this embodiment of the present invention the super configuration task only needs to be executed once.

With respect to the example in FIG. 2, configuration tasks executed in time periods LT1 212, LT2 222 and LT3 232 may be the same, e.g. for executing a loading operation. Similarly, configuration tasks executed in time periods NIT1 214, NIT2 224 and NIT3 234 may be identical tasks, e.g. for executing a network initializing operation. In one embodiment of the present invention, these same configuration tasks are combined into a super configuration task and are only executed once during running. Illustration is presented below with respect to FIG. 4.

Figure 4:
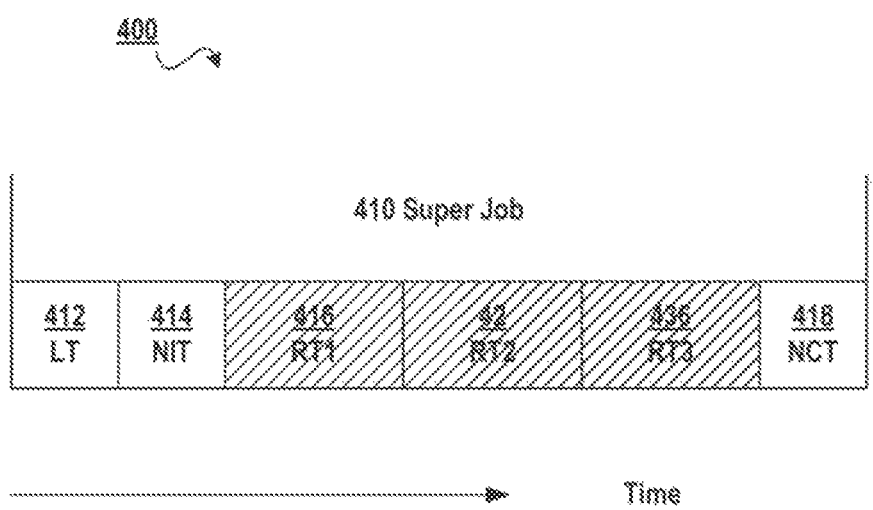
FIG. 4 schematically shows a sequence diagram 400 of a method for executing a super task according to one embodiment of the present invention.

FIG. 4 schematically shows a sequence diagram 400 of a method for executing a super task according to one embodiment of the present invention. This figure shows a sequence diagram of a super task that is formed after performing the method according to the present invention with respect to the multiple jobs shown in FIG. 2. As shown in FIG. 2, all of corresponding loading operation, network initializing operation, running operation and network clear-up operation need to be performed while executing each job, whereas only the running operation is used for executing tasks directly associated with the job's computation object and the other operations are auxiliary operations.

Using the method of the present invention, the three jobs shown in FIG. 2 may be merged into a super job, and tasks in the super job are scheduled and managed once again. Specifically, as shown in FIG. 4, loading times LT1 212, LT2 222 and LT3 232 of the three jobs shown in FIG. 2 are merged into a loading time LT 412 of a super job 410. Similarly, network initializing times of the three jobs in FIG. 2 are merged into a network initializing time NIT 414 of super job 410, and network clear-up times of the three jobs in FIG. 2 are merged into a network clear-up time NCT 418 of super job 410. Further, run times (i.e. RT1+RT2+RT3) of the three jobs in FIG. 2 are used as a run time of super job 410 as a whole. As seen from FIG. 4, the proportion of the run time of the super task to the total execution time is increased greatly, so the operation efficiency of the distributed computing system is improved.

In one embodiment of the present invention, the executable program is written based on a distributed computing basic function library. Since users of an executable program usually do not have source code of the executable program, they cannot optimize the operation efficiency of each executable program. Note when an executable program is written based on a distributed computing basic function library, a portion associated with a configuration task and a computation task may be extracted from code (e.g. binary code) of the executable program.

Figure 5:
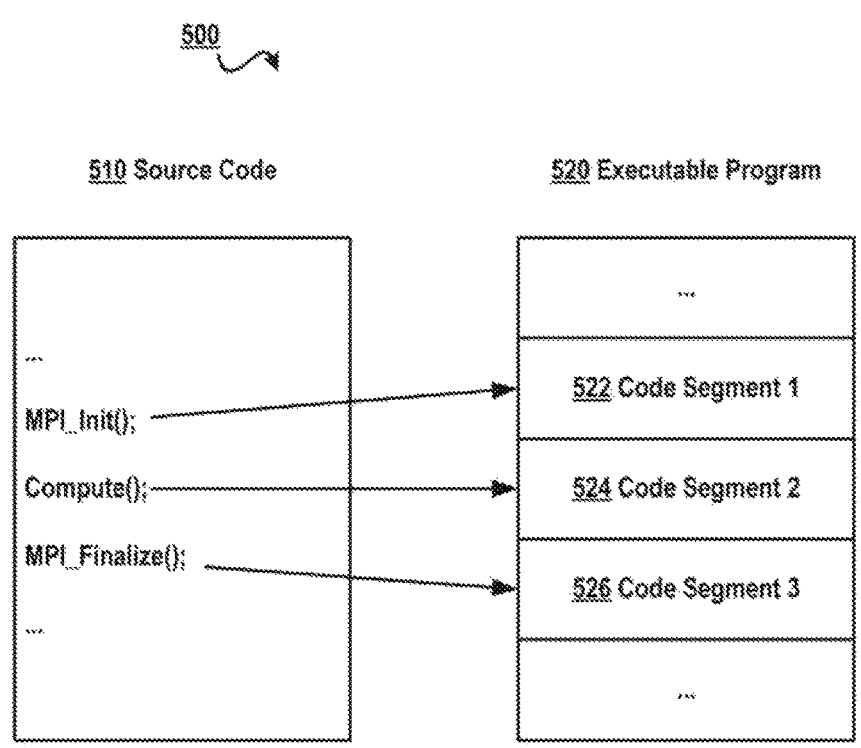
FIG. 5 schematically shows a mapping relationship between source code 510 and executable code 520 associated with a job.

FIG. 5 schematically shows a mapping relationship 500 between source code 510 and executable code 520 associated with a job. Those skilled in the art should understand an executable program is formed by compiling source code. Specifically, FIG. 5 on the left shows source code 510 associated with an executable program 520. When writing source code, functions in a distributed computing basic function library may be invoked. For example, MPI_Init( ) in the basic function library may be invoked to implement functionality associated with initialization, and MPI_Finalize( ) may be invoked to implement functionality associated with resource clear-up. Those skilled in the art should understand the functions MPI_Init( ) and MPI_Finalize( ) are illustrative only, and in the basic function library there may exist other functions associated with initialization and resource clear-up.

Executable program 520 on the right of FIG. 5 is an executable program resulting from compiling source code 510. Executable program 520 may take the form of binary code for example, and the binary code may comprise code segments corresponding to respective functions in the source code. For example, a code segment 1 522 may correspond to MPI_Init( ) a code segment 2 524 may correspond to Compute( ) and a code segment 3 526 may correspond to MPI_Finalize( ). Therefore, concrete meaning of an executable program may be analyzed by parsing code segments of the executable program. One embodiment of the present invention divides multiple tasks in a job into a configuration task and a computation task based on this principle.

Specifically, in one embodiment of the present invention, the dividing, in response to having received multiple jobs, multiple tasks comprised in each of the multiple jobs into a configuration task and a computation task comprises: with respect to a current job among the multiple jobs, according to definition of the distributed computing basic function library, extracting from multiple tasks in the current job at least one of the following as a configuration task: a scheduling task and a network resource management task, the scheduling task being used for launching the current job, the network resource management task being used for managing network resources needed for executing the current job; and taking other task than the configuration task among the multiple tasks in the current job as the computation task of the job.

Content of each function has been explicitly defined in the distributed computing basic function library, and content of a code segment associated with each function is also known. Therefore, according to definition of the distributed computing basic function library, at least any of the following may be extracted from multiple tasks in the current job as a configuration task: a scheduling task and a network resource management task.

With respect to the concrete example shown in FIG. 5, when it is defined in the basic function library that MPI_Init( ) and MPI_Finalize( ) are tasks for allocating and releasing network resources, it may be known that code segment 1 522 and code segment 3 526 in executable program 520 are network resource management tasks. Similarly, those skilled in the art may determine which code segments belong to scheduling tasks based on definition of functions associated with scheduling tasks in the basic function library. Note MPI_Init( ) and MPI_Finalize( ) are illustrative only, and they show operations before entering and after exiting a user program. With respect to a basic function library provided by a different vendor, other one or more functions may represent operations of allocating and releasing resources.

After determining the configuration task, other task than the configuration task among the multiple tasks in the current job may be used as the computation task of the job. With respect to the concrete example in FIG. 5, it may be determined that code segment 2 524 corresponding to Computer( ) belongs to the computation task. Note although in FIG. 5 the computation task is represented by Compute( ) only, those skilled in the art may understand the computation task refers to multiple tasks that are executable at least partially in parallel by various computing nodes in the distributed computing system.

Figure 6:
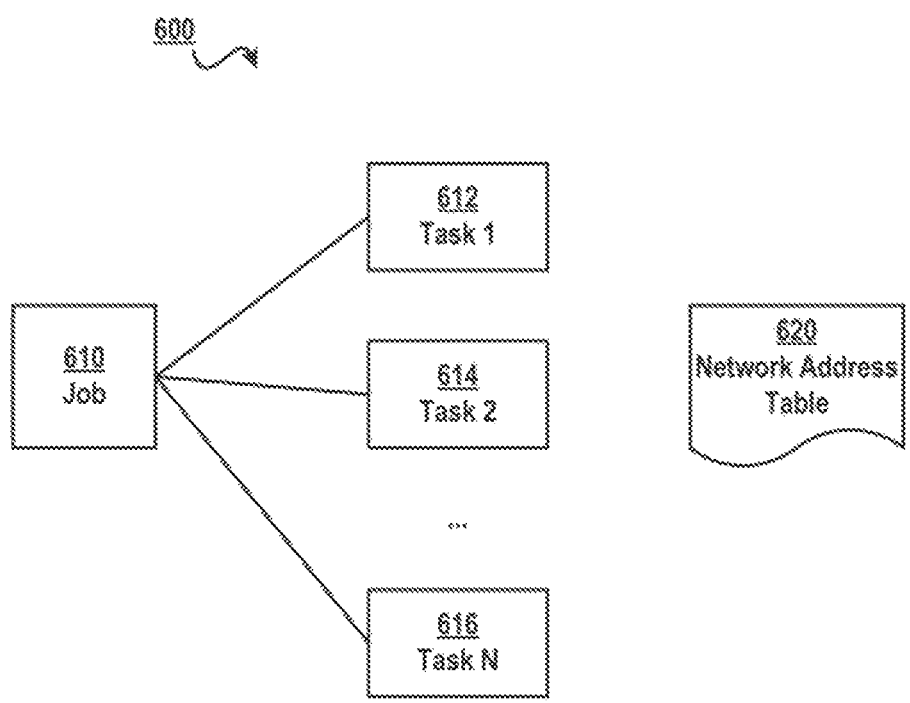
FIG. 6 schematically shows a schematic view of principles for executing a job 610 comprising parallel tasks according to one embodiment of the present invention.

With reference to FIG. 6, description is presented below to how to execute multiple tasks in parallel. FIG. 6 schematically shows a schematic view 600 of principles for executing a method comprising parallel tasks according to one embodiment of the present invention. For example, a job 610 may comprise multiple tasks, i.e. a task 1 612, a task 2 614, . . . , a task N 616, among which at least one part may be executed in parallel.

According to one principle of distributed computing, while executing a job, each task may have a specific network address. During the initial phase of executing the job, each task may send its network address to a specific device so as to build a network address table comprising network addresses of respective tasks (or the specific device proactively collects network addresses of respective tasks to build a network address table, etc.). Subsequently, multiple tasks may communicate with each other via addresses in the network address table, so as to accomplish the job. For example, multiple tasks 1 612, 2 614, . . . , N 616 shown in FIG. 6 communicate with one another via a network address table 620.

In one embodiment of the present invention, the network resource management task at least comprises a network initialization task and a network clear-up task.

In one embodiment of the present invention, the network initialization task at least comprises: collecting network addresses of various computation tasks so as to form a network address table for communication between the various computation tasks. Those skilled in the art should understand in this embodiment the network initialization task may comprise, for example, operations of building network address table 620 with respect to tasks 1 612 . . . N 616 shown in FIG. 6.

In one embodiment of the present invention, the network clear-up task at least comprises: clearing up the network address table. Note since the network address table is associated with specific tasks in a job, when all tasks in the job have been executed, the network address table becomes useless and thus needs to be removed. In this embodiment, the network clear-up task may comprise, for example, operations of removing the network address table.

Note although the network initialization task and the network clear-up task have been illustrated above in the context of building and removing a network address table respectively, the two tasks may further comprise other operations. For example, the network initialization task may further comprise setting network configurations of various computing nodes in the distributed computing system, etc.

In one embodiment of the present invention, the executing the super configuration task and the computation tasks comprised in the super job by using multiple computing nodes in a distributed computing environment comprises: executing the super configuration task serially with the computation tasks; and executing the computation tasks at least partially in parallel.

On the one hand, the super configuration task functions set an appropriate environment for the computation tasks and reset the computing environment upon completion of the computation tasks. Therefore, the super configuration task may be executed serially with the computation tasks. For example, network resources of the distributed computing system may be initialized before executing the computation tasks and then released after executing the computation tasks. On the other hand, the computation tasks may comprise multiple parallel executable tasks. Therefore, these computation tasks may be executed at least partially in parallel by multiple computing nodes according to general principles of distributed computing technology.

In one embodiment of the present invention, the executing the super configuration task serially with the computation tasks comprises: serially executing the scheduling task, the network initialization task, the computation tasks, and the network clear-up task. Detailed description is presented below with reference to FIG. 7.

Figure 7:
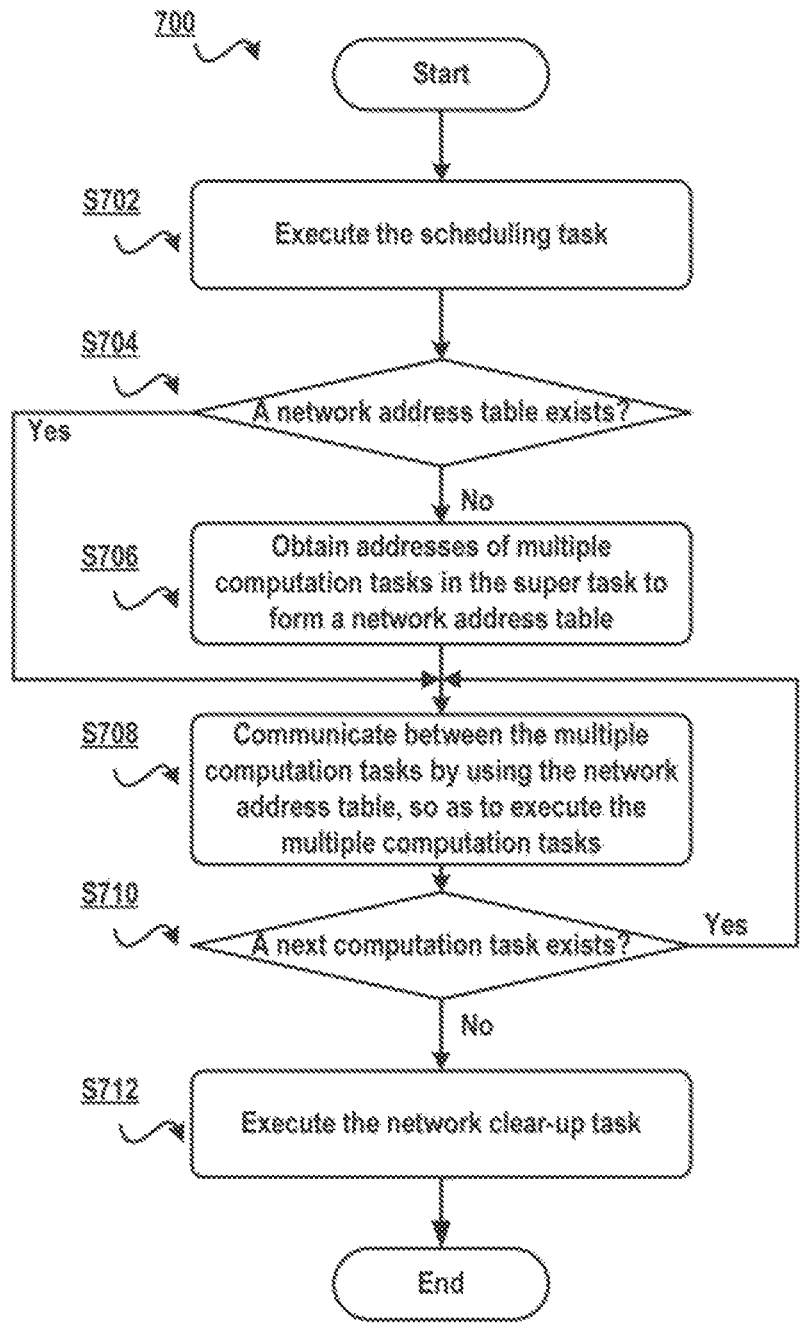
FIG. 7 schematically shows a flowchart of a method for executing a super task according to one embodiment of the present invention.

FIG. 7 schematically shows a flowchart 700 of a method for executing a super task according to one embodiment of the present invention. First, in step S702 a scheduling task is executed to launch a current job. In step S704 it is determined whether or not there exists a network address table in a distributed computing system. If "No," then in step S706 network addresses of multiple computation tasks in the super task are retrieved so as to form the network address table. Then the operational flow proceeds to step S708. If "Yes," then the operational flow proceeds to step S708.

In step S708 communication is conducted between the computation tasks by using the network address table, so as to execute the computation tasks. When one of the computation tasks is completed, in step S710 it is determined whether or not a next computation task exists: if yes, then the operational flow returns to step S708. If all the computation tasks are completed, then the operational flow proceeds to step S712 to release network resources.

Note in the method shown in FIG. 7 steps S704 to S706 belong to the network initialization task, and steps S708 to S710 belong to the computation task. Note operations shown in steps S708 to S710 are not performed at a single computing node but may be executed at multiple computing nodes in the distributed computing system. For example, an idle computing node may query whether or not there exists a next computation task; if finding there is a pending computation task A, the idle node may execute computation task A.

In one embodiment of the present invention, the executing the computation tasks at least partially in parallel comprises: communicating between the computation tasks by using the network address table, so as to execute the computation tasks. The network address table may record a network address uniquely identifying each computation task in the job. For example, a network address of computation task A may be represented as "AAAA," while a network address of a computation task B may be represented as "BBBB." When computation task A needs to send a message to computation task B, it directly transmits data packets to the network address "BBBB." The computation tasks deliver messages via network addresses in the network address table; as messages are delivered between corresponding computation tasks, the respective computation tasks are accomplished.

Figure 8:
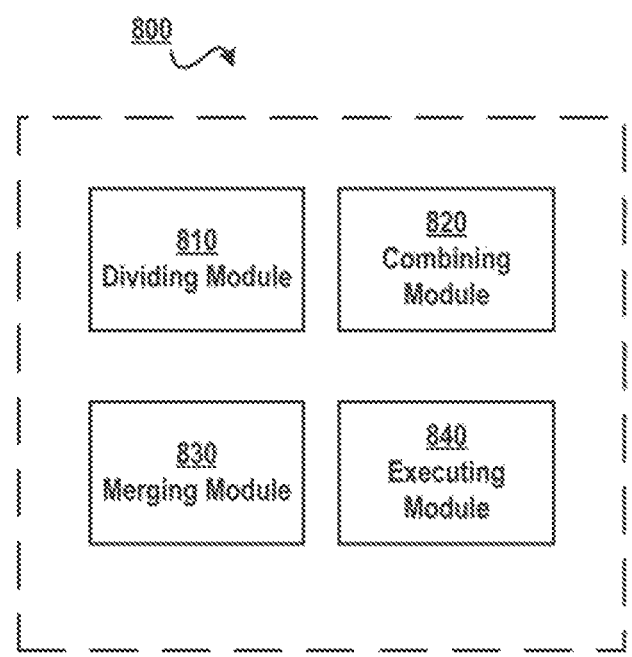
FIG. 8 schematically shows a block diagram 800 of an apparatus for managing multiple jobs in a distributed computing system according to one embodiment of the present invention.

FIG. 8 schematically shows a block diagram 800 of an apparatus for managing multiple jobs in a distributed computing system according to one embodiment of the present invention. Specifically, there is an apparatus provided for managing multiple jobs in a distributed computing system, the apparatus comprising: a dividing module 810 configured to divide, in response to having received multiple jobs, multiple tasks comprised in each of the multiple jobs into configuration tasks and computation tasks; a combining module 820 configured to combine the configuration tasks associated with the multiple jobs into a super configuration task; a merging module 830 configured to merge the multiple jobs into a super job based on the super configuration task and the computation tasks; and an executing module 840 configured to execute the super configuration task and the computation tasks comprised in the super job by using multiple computing nodes in a distributed computing environment, wherein each of the multiple jobs is an executable program.

In one embodiment of the present invention, the super configuration task is executed only once.

In one embodiment of the present invention, the executable program is written based on a distributed computing basic function library.

In one embodiment of the present invention, dividing module 810 comprises: an extracting module configured to, with respect to a current job among the multiple jobs, according to definition of the distributed computing basic function library, extract at least one of the following as a configuration task from multiple tasks in the current job: a scheduling task and a network resource management task, the scheduling task being used for launching the current job, the network resource management task being used for managing network resources needed for executing the current job; and a specifying module configured to take other task than the configuration task among the multiple tasks in the current job as the computation task of the job.

In one embodiment of the present invention, the network resource management task at least comprises a network initialization task and a network clear-up task.

In one embodiment of the present invention, executing module 840 comprises: a serial executing module configured to execute the super configuration task serially with the computation tasks; and a parallel executing module configured to execute the computation tasks at least partially in parallel.

In one embodiment of the present invention, the serial executing module comprises: a first serial module configured to serially execute the scheduling task, the network initialization task, the computation tasks, and the network clear-up task.

In one embodiment of the present invention, the network initialization task at least comprises: collecting network addresses of various computation tasks so as to form a network address table for communication between the various computation tasks.

In one embodiment of the present invention, the network clear-up task at least comprises: clearing up the network address table.

In one embodiment of the present invention, the parallel executing module comprises: a communicating module configured to communicate between the computation tasks by using the network address table, so as to execute the computation tasks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
 receiving, in a distributed computing environment, a plurality of files for execution;
 identifying, by parsing the plurality of files, code segments contained in each of the plurality of files;

determining, based on a comparison of the code segments and definitions contained in a distributed computing basic function library, a first group of the code segments that include configuration tasks and a second group of the code segments that include computational tasks;

combining the first group of the code segments to form a super configuration task;

creating an executable code, wherein the executable code comprises the super configuration task and the second group of the code segments;

allocating the executable code to one or more nodes of the distributed computing environment; and executing the executable code on the one or more nodes of the distributed computing environment.

2. The method of claim 1, wherein the super configuration task is only executed once.

3. The method of claim 1, wherein the plurality of files are written based on the distributed computing basic function library.

4. The method of claim 1, wherein the determining the first group of the code segments and the second group of the code segments comprises:

identifying, from each of the plurality of files based on the definitions contained in the distributed computing basic function library, scheduling tasks and network resource management tasks as configuration tasks; and identifying tasks that are not configuration tasks as being computational tasks.

5. The method of claim 4, wherein the scheduling tasks are tasks used for launching one or more of the computational tasks and the network resource management tasks are tasks used for managing network resources needed for executing one or more of the computational tasks.

6. The method of claim 5, wherein the network resource management tasks include network initialization tasks and network clear-up tasks.

7. The method of claim 6, wherein the network initialization tasks include collecting network addresses for the computational tasks to form a network address table.

8. The method of claim 7, wherein the network clear-up tasks include clearing the network address table.

9. The method of claim 1, wherein the executing the executable code on one or more nodes of the distributed computing environment comprises:

executing the super configuration task and one or more of the computational tasks in serial; and executing one or more of the computational tasks at least partially in parallel.

* * * * *